(12) United States Patent
Wal, III

(10) Patent No.: US 6,279,888 B1
(45) Date of Patent: Aug. 28, 2001

(54) MODULAR TOOLING SYSTEM WITH RADIAL BASE PLATFORM

(76) Inventor: H. James Vander Wal, III, 7112 - 30th St. SE., Ada, MI (US) 49301-9312

( * ) Notice: Subject to any disclaimer, the term of this patent is extended or adjusted under 35 U.S.C. 154(b) by 0 days.

(21) Appl. No.: 09/536,669

(22) Filed: Mar. 27, 2000

Related U.S. Application Data

(60) Provisional application No. 60/131,098, filed on Apr. 26, 1999.

(51) Int. Cl.[7] ...................................................... B25B 1/20
(52) U.S. Cl. ..................... 269/37; 269/900; 269/289 R; 269/309; 269/47
(58) Field of Search .................... 269/37, 900, 289 R, 269/47, 309

(56) References Cited

U.S. PATENT DOCUMENTS

| | | | | |
|---|---|---|---|---|
| 724,116 | * | 3/1903 | Maley | 269/305 |
| 2,076,207 | * | 4/1937 | Powell | 269/305 |
| 4,496,165 | * | 1/1985 | Schrekeis et al. | 269/283 |
| 4,794,687 | * | 1/1989 | Peters et al. | 269/900 |
| 5,941,700 | * | 8/1999 | Fuchs | 269/305 |

* cited by examiner

Primary Examiner—Joseph J. Hail, III
Assistant Examiner—Lee Wilson
(74) Attorney, Agent, or Firm—Van Dyke, Gardner, Linn & Burkhart, LLP

(57) ABSTRACT

A modular fixturing apparatus platform includes a plate, which has a center and a plurality of axes extending radially outward from the center. The plate includes a plurality of mounting openings configured to receive fasteners. The mounting openings are arranged in a rectangular array and aligned along one of the radiating axes of the plate. The rectangular array includes at least two rows of the mounting openings. In one form, the mounting openings are arranged in a repeating square pattern within the rectangular array. Preferably, the plate comprises a sub-plate, and the platform further includes at least one base plate, which is mounted on the sub-plate. The base plate includes the rectangular array of mounting openings and is aligned along one of the radiating axes of the sub-plate.

26 Claims, 7 Drawing Sheets

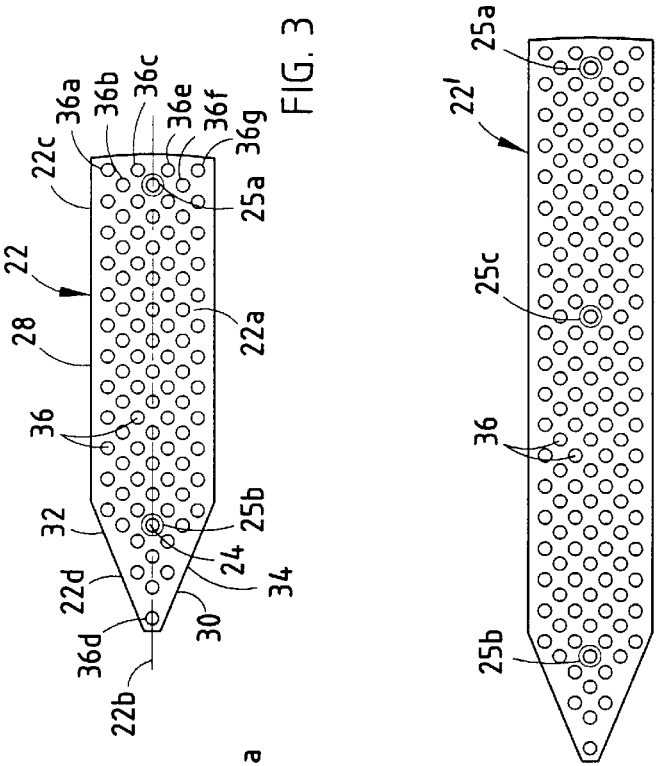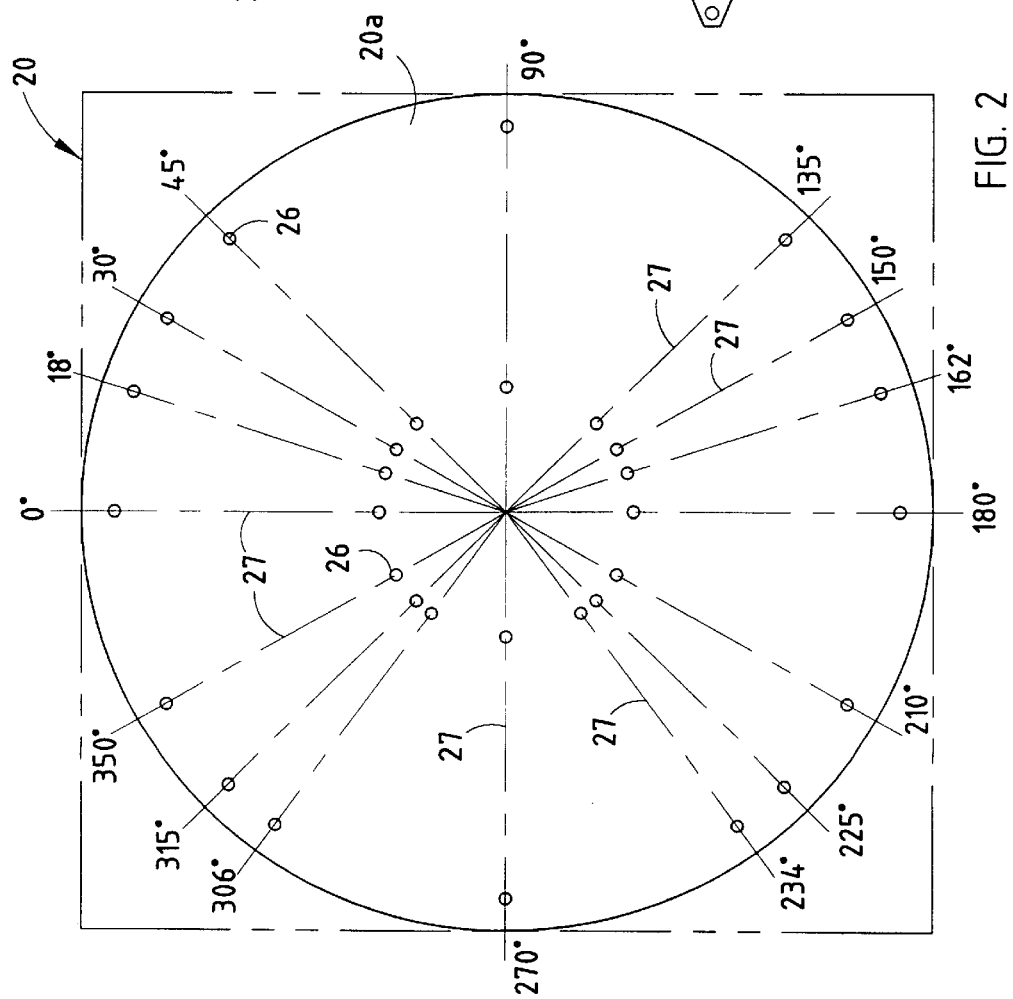

MODULAR TOOLING SYSTEM WITH RADIAL BASE PLATFORM

This patent application claims priority from provisional Pat. Application Ser. No. 60/131,098 entitled MODULAR TOOLING SYSTEM WITH RADIAL BASE PLATFORM filed on Apr. 26, 1999.

TECHNICAL FIELD AND BACKGROUND OF THE INVENTION

The present invention relates to a fixturing apparatus and, in particular, to a modular fixturing apparatus used to support an object undergoing manufacturing, inspection, or testing processes or the like. The invention is particularly suitable for supporting or holding a component undergoing quality control inspection by a coordinate measuring machine (CMM) and may also be used to support or hold objects undergoing light to moderate manufacturing processing, such as assembling, soldering, laser-jet and water-jet cutting, welding, light-machining, and the like.

A typical modular fixturing apparatus includes a base plate and a series of components which can be mounted to the base plate. The base plate includes a plurality of mounting openings which permit the components to be secured to the base plate in a variety of different locations. These components include, for example, risers, spacers, clamps, including vacuum-based clamps, springs, fasteners, magnets, and the like which may be arranged on and secured to the base plate and interconnected in a variety of ways in order to allow a particular object to be supported and, in some cases, secured to the base plate. Furthermore, in modular fixturing apparatus, these components can be disassembled and reassembled so that the components can be reused in different configurations on the same or another base plate to create different fixture configurations to accommodate a variety of parts, ranging from, for example, a computer part to an airplane part. Once a configuration of the components is assembled for a given part, typically the locations of the components on the base plate and configurations of the components are recorded so that future set ups for that particular part can be quickly assembled.

The configurations of these components, however, are limited by the locations of the mounting openings in base plates. Typical fixturing base plates have fixed mounting openings that are arranged in a rectangular matrix pattern or in a radial pattern. The rectangular pattern includes a plurality of mounting holes arranged in rows and columns. On the other hand, the radial pattern has radiating lines or "spokes" of mounting openings. The rectangular pattern is generally more suitable for use with rectangular objects, whereas the radial pattern of mounting openings is more suitable for use with round or radiating objects and irregular shaped objects, such as a bearing, propeller, turbine, chair bases, blade assemblies, wheels, etc. However, many radiating objects, such as chair base legs, need to be tooled on both sides of the legs. With conventional radiating mounting hole patterns, however, it is difficult to tool between the "spokes" of the radiating pattern. In addition, many objects or parts have compound or complex configurations which could not easily be accommodated by either pattern. As a result, fixturing set ups for these types of objects, on both the rectangular and radial mounting opening patterns, necessitate complex mounting component configurations. With more complex component configurations, the fixturing process becomes more difficult and time consuming, adding to the cost of the fixturing set up.

Consequently, there is a need for a modular fixturing system which is capable of providing exceptional flexibility in the design of object support fixtures. Such system should be capable of supporting or securing objects, even large objects, which have regular, radiating, compound, or complex configurations that is most advantageous to the process for which the object is undergoing.

SUMMARY OF THE INVENTION

The present invention overcomes the difficulties of the prior art by providing a modular fixturing system which is capable of supporting objects, even large objects, having a wide variety of shapes or configurations and more particularly for supporting round or radial parts.

According to one form of the invention, a modular fixturing apparatus platform includes a plate, which has a center and a plurality of axes extending radially outward from the center. The plate includes a plurality of mounting openings configured to receive fasteners, with the plurality of mounting openings being arranged in a rectangular array and being aligned along one of the radiating axes. The rectangular array includes at least two rows of the mounting openings.

In one aspect, the mounting openings are arranged in a repeating square pattern within the rectangular array.

In other aspects, the plate comprises a sub-plate. The platform further includes at least one base plate, which includes the rectangular array of mounting openings and is mounted to the sub-plate and aligned along one of the radiating axes. Further, the sub-plate preferably includes a second plurality of mounting openings, with the second plurality of mounting openings being arranged in first and second concentric circular patterns around the center and, optionally, can be arranged as three or more concentric patterns. Each of the openings of the first circular pattern is associated with the respective opening of the second circular pattern and which are aligned along a respective radiating axis to form a pair of radiating mounting openings. The base plate is preferably fastened to one pair of the respective radiating mounting openings. For example, the base plate may include pairs of respective radiating mounting openings at intervals of 90°, 45°, 30°, and 72°.

According to one form of the invention, a fixturing platform includes a sub-plate and at least one base plate which is secured to the sub-plate by fasteners. The sub-plate includes a plurality of radially arranged mounting openings which define a plurality of mounting positions for the base plate. The base plate is removably secured in one of the plurality of mounting positions on the sub-plate and arranged in a radial pattern on the sub-plate. Each base plate includes a plurality of mounting openings arranged in a rectangular array. This allows complicated fixture arrangements to be quickly assembled while offering a variety of base plate configurations in order to accommodate all possible part or object configurations and reducing the weight of the fixturing apparatus.

In a preferred form, the mounting openings on the base plate are arranged in a repeating square pattern within the rectangular array.

In further aspects of the invention, the platform includes a plurality of base plates, with each base plate including a rectangular array of mounting openings.

These and other objects, advantages, and features of this invention will become apparent upon review of the following specification in conjunction with the drawings.

BRIEF DESCRIPTION OF THE DRAWINGS

FIG. 2 is a plan view of a sub-plate of the platform in FIG. 1;

FIG. 3 is a plan view of a base plate of the platform in FIG. 1;

FIG. 4 is a plan view of a second platform of the present invention with one base plate mounted to the sub-plate;

DESCRIPTION OF THE PREFERRED EMBODIMENT

Figure 1:
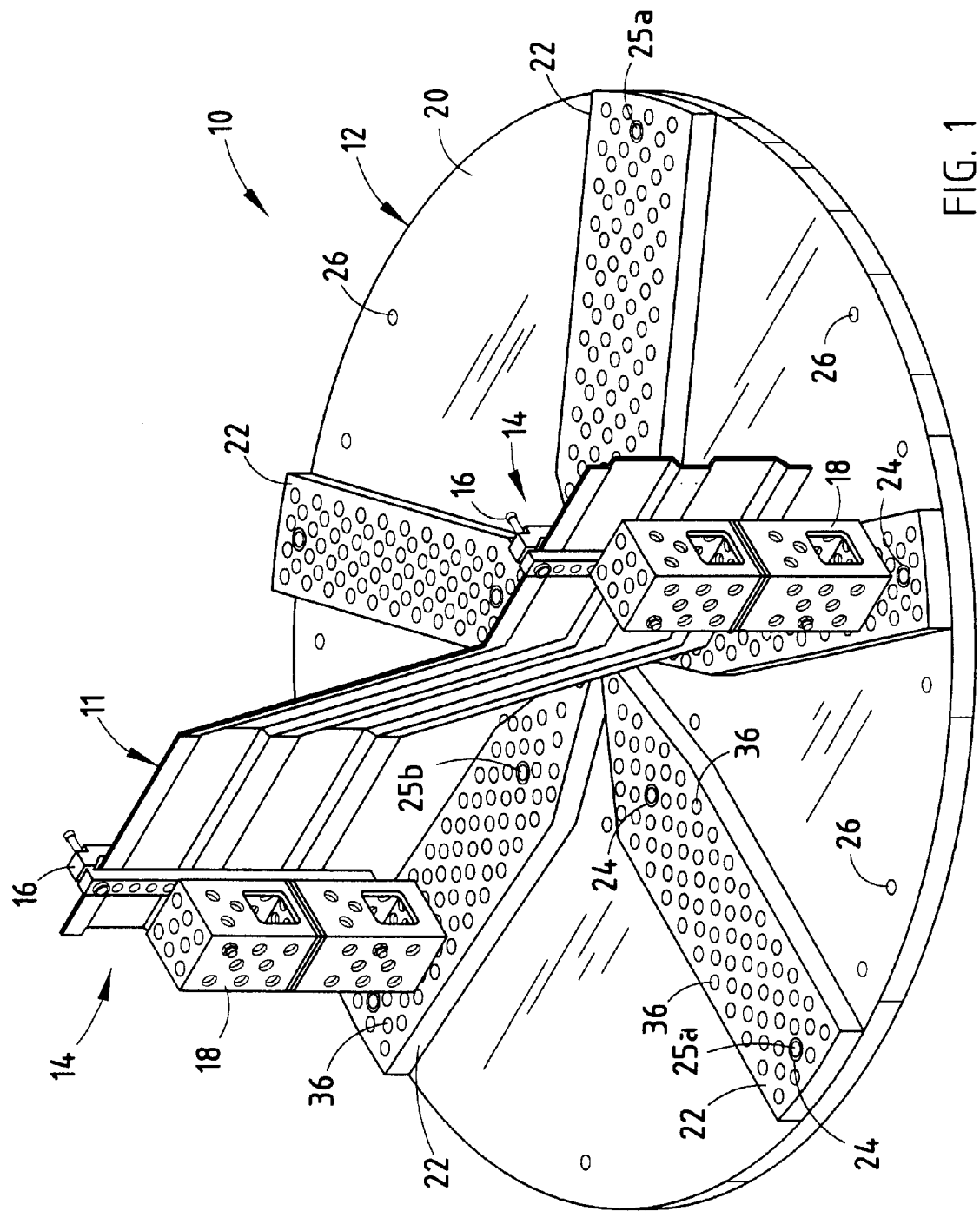
FIG. 1 is a perspective view of a modular fixture apparatus according to the present invention with the fixturing apparatus supporting an object.
Figure 6:
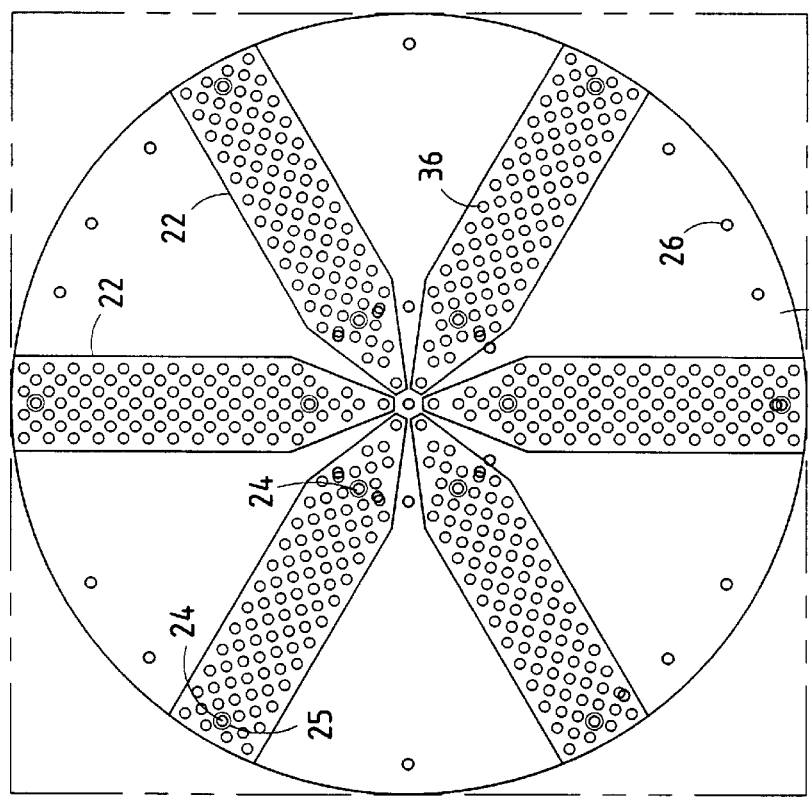
FIG. 6 is a plan view of a fourth platform configuration.
Figure 5:
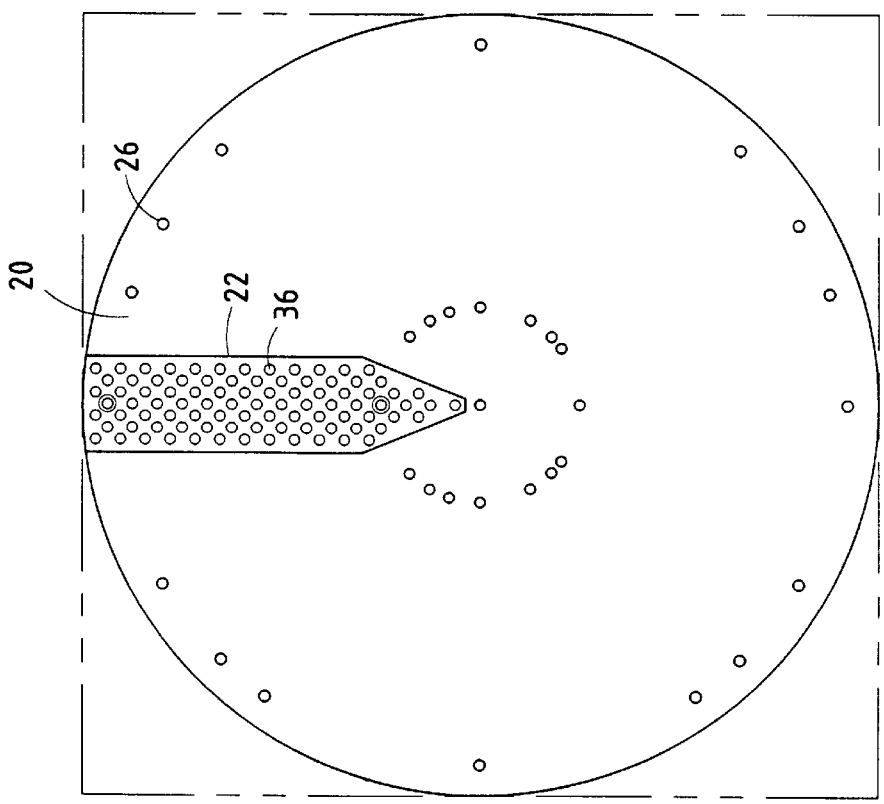
FIG. 5 is a plan view of a third platform with six base plates mounted to the sub-plate.

Referring to FIG. 1, the numeral 10 generally designates a modular fixturing apparatus of the present invention. Modular fixturing apparatus 10 supports or holds an object 11. In the illustrated embodiment, object 11 comprises a panel, but it should be understood that modular fixturing apparatus 10 may support a wide range of objects, including, for example, an automotive part, a bearing, a chair base, a wheel, a blade assembly, a computer component, an airplane component, or any other object undergoing inspection or a light-manufacturing process.

Modular fixturing apparatus 10 includes a platform 12 and one or more mounting components 14 which are mounted to platform 12 for supporting or holding the object. In the illustrated embodiment, mounting components 14 include clamps 16 and stackable spacer tubes 18 of the type disclosed in U.S. Pat. No. 5,887,733 to Robert A. Harvey and H. James Vander Wal, III, assigned to OMNI Structures International, Inc. of Mich., the disclosure of which is incorporated by reference herein in its entirety. It should be understood that the term "mounting components" includes clamps, as noted above, including vacuum clamps, magnets, risers, spacers, fasteners, and other known components for supporting and/or holding objects on a platform.

Platform 12 includes a sub-plate 20 and one or more base plates 22, which are secured to sub-plate 20 by fasteners 24 which extend through mounting openings 25a and 25b provided in base plate 22 to engage threaded mounting openings 26 provided on sub-plate 20. Sub-plate 20 may comprise a circular plate (as shown in solid lines in FIGS. 2, 5–8) or a rectangular sub-plate (as shown in phantom in FIGS. 2, 5–8), or the like. In preferred form, sub-plate 20 and base plate 22 are machined aluminum and, preferably, anodized in order to preserve their surface characteristics. However, other materials, such as steel and structural plastics, may be used.

As best seen in FIG. 2, sub-plate 20 includes a plurality of threaded mounting openings 26 which are arranged in a radial pattern on sub-plate 20. A first group of the mounting openings are arranged in a first circular pattern around a peripheral portion 20a of base plate 20. A second group of the mounting openings are arranged in a second circular pattern radially inward of the first group of mounting openings to form with the first group of mounting openings a polar or radial hole pattern. Preferably, each mounting opening of the first circular pattern is associated and aligned with a mounting opening of the second circular pattern, which are both aligned along a radiating axis 27 to define a pair of spaced-apart radiating mounting openings for base plates 22. In this manner, base plates 22 may be mounted to sub-plate 20 in one of a plurality of radial mounting positions on sub-plate 20, as will be more fully described below.

Referring again to FIG. 2, as noted above, mounting openings 26 are arranged to align along radial axes 27 extending from the center of sub-plate 20 to provide a pair of mounting openings along each radial axis for a respective base plate 22. For example, in the illustrated embodiment, mounting openings 26 are arranged to align along radial axes 27 extending from the center of sub-plate at 0°, 18°, 30°, 45°, 90°, 135°, 150°, 162°, 180°, 210°, 225°, 234°, 270°, 306°, 315°, and 330° as indicated in FIG. 2. In this manner, one, two, three, four, five, six, or eight base plates 22 may be mounted to sub-plate 20 in a generally uniformly spaced radial pattern. Several examples of the mounting positions are shown in FIGS. 5–8. It should be understood that mounting openings 26 may be arranged along other radiating axes at different angles as needed, for example every 15°.

Figure 8:
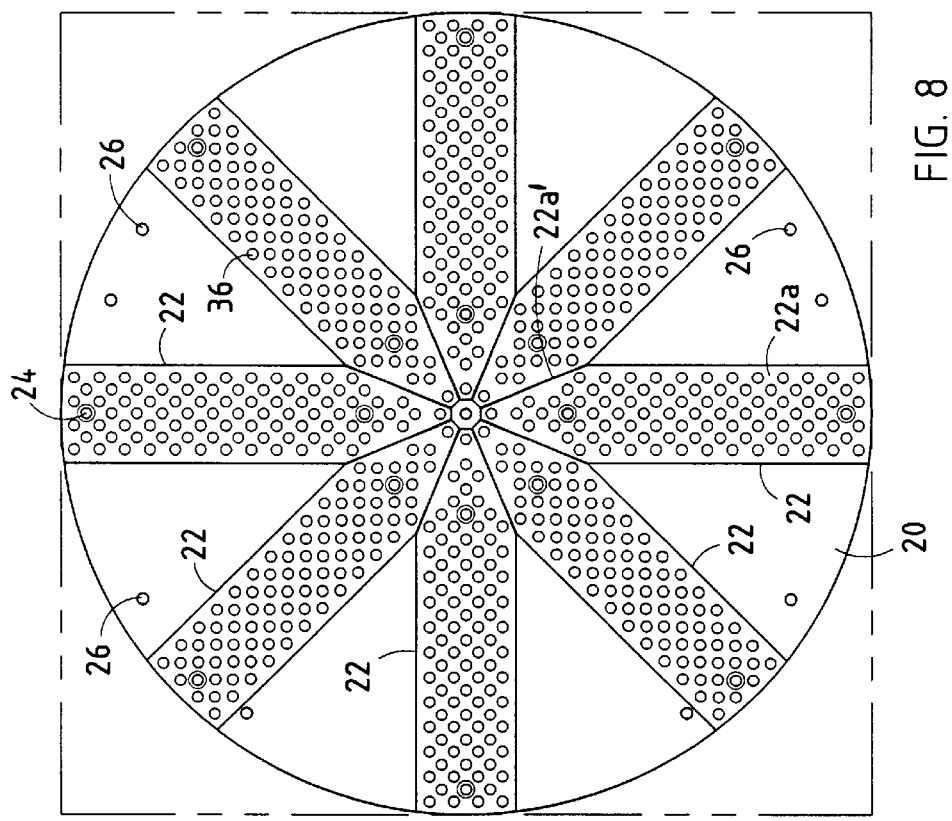
FIG. 8 is a plan view of a sixth platform configuration, illustrating a second sub-plate and third and fourth base plates.
Figure 7:
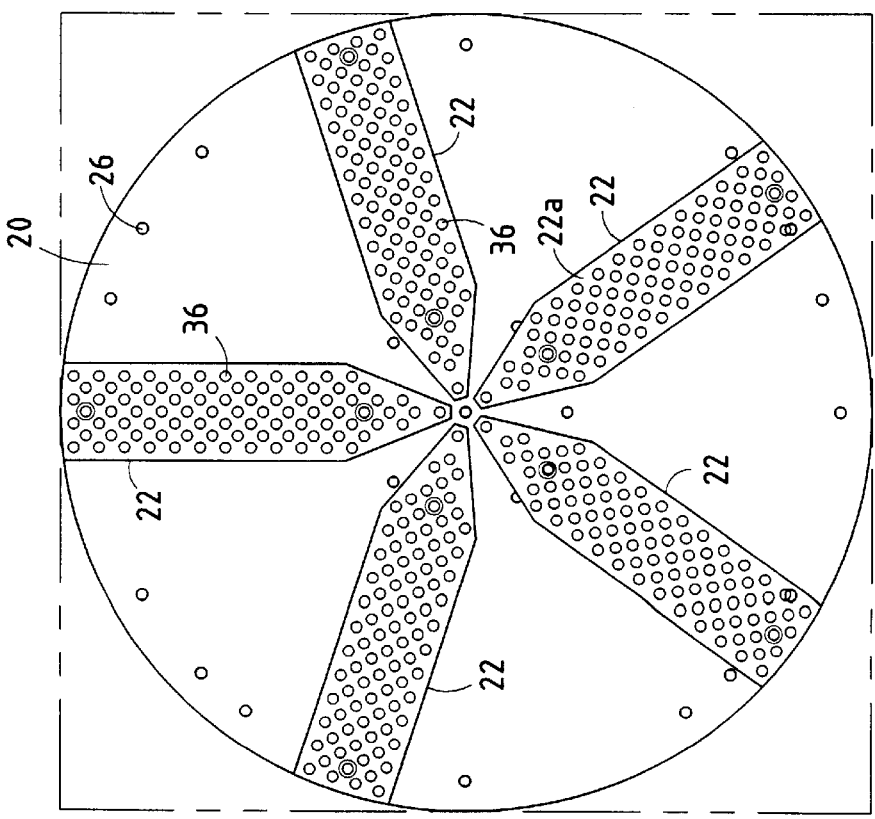
FIG. 7 is a plan view of a fifth platform configuration.

Referring to FIG. 3, each base plate 22 comprises an elongated plate having a rectangular portion 28 and a segment portion 30, which define a substantially continuous, but foraminous, bearing and support surface 22a. Segment portion 30 is defined between tapered sides 32 and 34, which extend from rectangular portion 28 and are angled with respect to each other to allow base plates 22 to be positioned in close relationship to adjacent base plates 22 and, in some arrangements, to abut each other. In the illustrated embodiment, tapered sides 32 and 34 are angled approximately 45° with respect to each other such that when eight (8) base plates 22 are mounted to sub-plate 20 (as shown in FIG. 8), base plates 22 are abutting adjacent respective base plates 22 to provide a substantially continuous, but foraminous, collective support or bearing surface 22a'. It should be understood that the angle formed by sides 32 and 34 may be increased or decreased as desired to accommodate more or less base plates 22 on sub-plate 20.

Base plates 22 are also provided with a plurality of threaded mounting openings 36 to which mounting components 14 are secured by fasteners (not shown). Threaded mounting openings 36 are arranged on base plate 22 in equally spaced rows 36a, 36b, 36c, 36d, 36e, 36f, and 36g, with every other row 36b, 36d, and 36f being offset along the longitudinal axis 22b of base plate 22 to form a generally rectangular array of openings. In preferred form, the offset rows 36b, 36d, and 36f of mounting openings 36 result in mounting openings 36 forming square or diamond patterns within the rectangular array of openings. It should be understood that the number of rows with the rectangular array be increased or decreased as needed with a corresponding increase or decrease in the width of the base plate and, further with a corresponding increase or decrease in angle between tapered sides 32 and 34. Further, other hole patterns within the rectangular array are also contemplated.

As best seen in FIG. 3, a middle row 36d of openings 36 is preferably aligned along longitudinal axis 22b along with mounting openings 25a and 25b. In this manner, the mounting openings are generally evenly and uniformly distributed over base plate 22 to provide greater stability to base plate 22. In order to further stabilize base plate 22 when it is mounted to sub-plate 20, opening 25a is positioned adjacent outward end 22c of base plate 22, with opening 25b positioned between tapered sides 32 and 34 but spaced inwardly from proximate end 22d of base plate 22. Most preferably, opening 25b is positioned in close proximity to rectangular portion of base plate 22 to assure base plate 22 has adequate overturning resistance when mounted to sub-plate 20.

Referring again to FIG. 3, in some applications, a longer base plate 22' is illustrated. Base plate 22' is suitable for larger applications such as for use on sub-plates with 36" diameter or greater or for high load applications. In the illustrated embodiment, base plate 22' includes three mounting openings 25a, 25b, 25c to reduce the stress on the base plate. It should be understood that the number of mounting openings may be increased as desired to accommodate even larger load or size applications.

Figure 10:
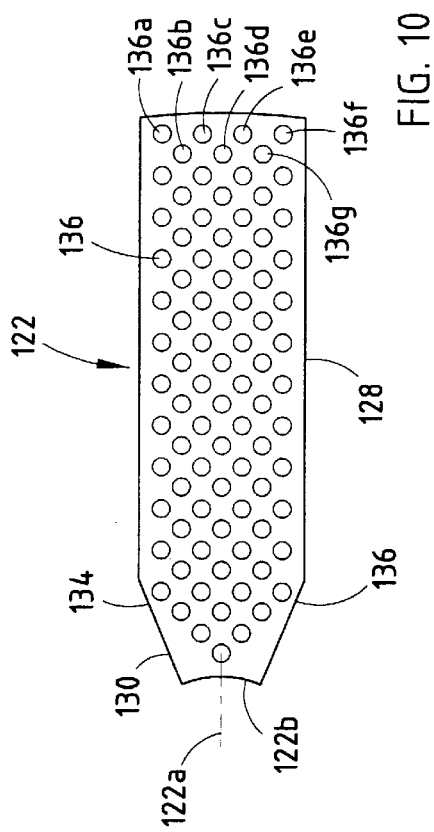
FIG. 10 is an enlarged view of a sub-plate of the platform of FIG. 9.
Figure 11:
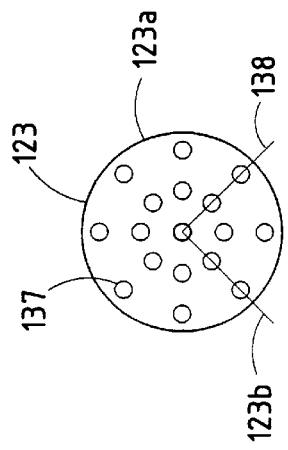
FIG. 11 is an enlarged view of a second sub-plate of the platform of FIG. 9.
Figure 9:
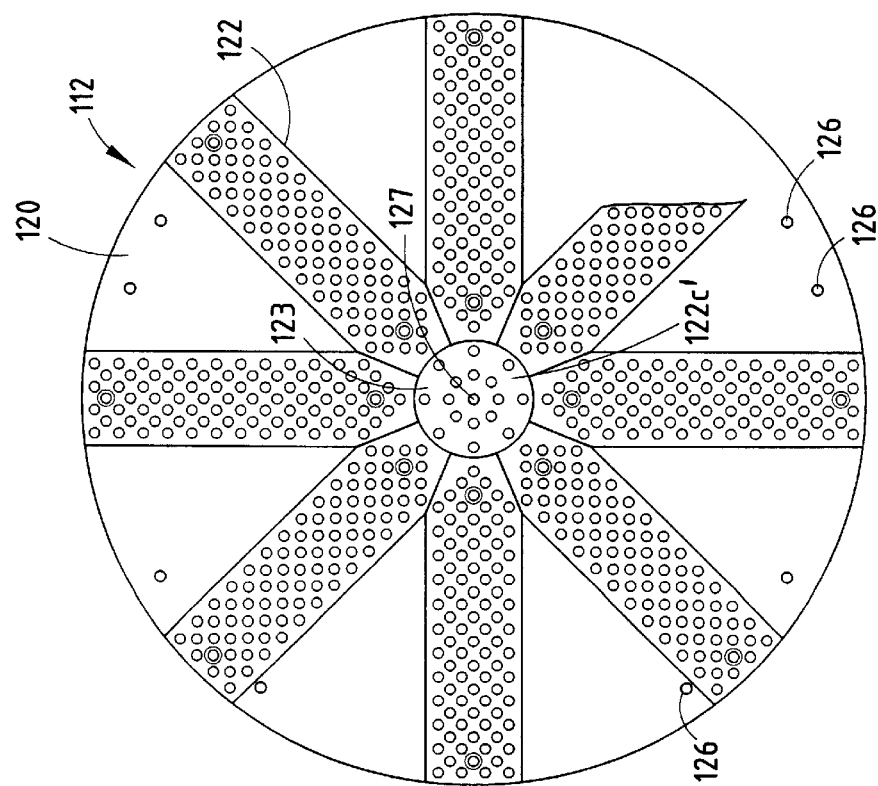
FIG. 9 is a plan view of a seventh embodiment of a platform configuration of the present invention.

Another form of a platform 112 is illustrated in FIGS. 9–11. Referring to FIG. 9, platform 112 includes a sub-plate 120 and one or more base plates 122 and 123. In a similar manner to the previous embodiment, sub-plate 120 includes a plurality of mounting openings 126 which are arranged in a radial pattern. In this embodiment, base plate 123 comprises a hub base plate formed from a circular plate member which is secured to a center mounting hole 127 provided at the center of sub-plate 120.

Referring to FIG. 10, base plate 122 includes a plurality of mounting openings 136 which are arranged in a rectangular array with seven rows 136a, 136b, 136c, 136d, 136e, 136f, 136g. Similar to the previous embodiments, every other row 136b, 136d, and 136f are offset along a longitudinal axis 122a of base plate 122 such that mounting openings 136 form square or diamond-shaped patterns within the rectangular array. Base plate 122 is of similar construction to base plate 22 and includes a rectangular portion 128 and a segment portion 130. Segment portion 130 is defined between tapered sides 132 and 134 which extend from rectangular portion 128 and further includes a radiused proximate end 122b. In this manner, when base plates 122 are mounted to sub-plate 120, proximate ends 122b will abut the circumference 123a of hub base plate 123 to form a substantially continuous support surface 122c'.

As best seen in FIG. 11, hub plate 123 includes a plurality of mounting openings 137, which are radially aligned along axes 138 which extend outwardly from the center 123b of circular hub 123. Preferably, mounting openings 137 are arranged in first and second circular patterns which extend around center 123b. More preferably, mounting openings 137 are arranged in pairs which align with the center row 136d of mounting openings 136 of each respective base plate 122. As described in reference to the previous embodiment, the number of base plates 122 may be increased or decreased as desired and further may be arranged at different angular intervals as desired.

Figure 13:
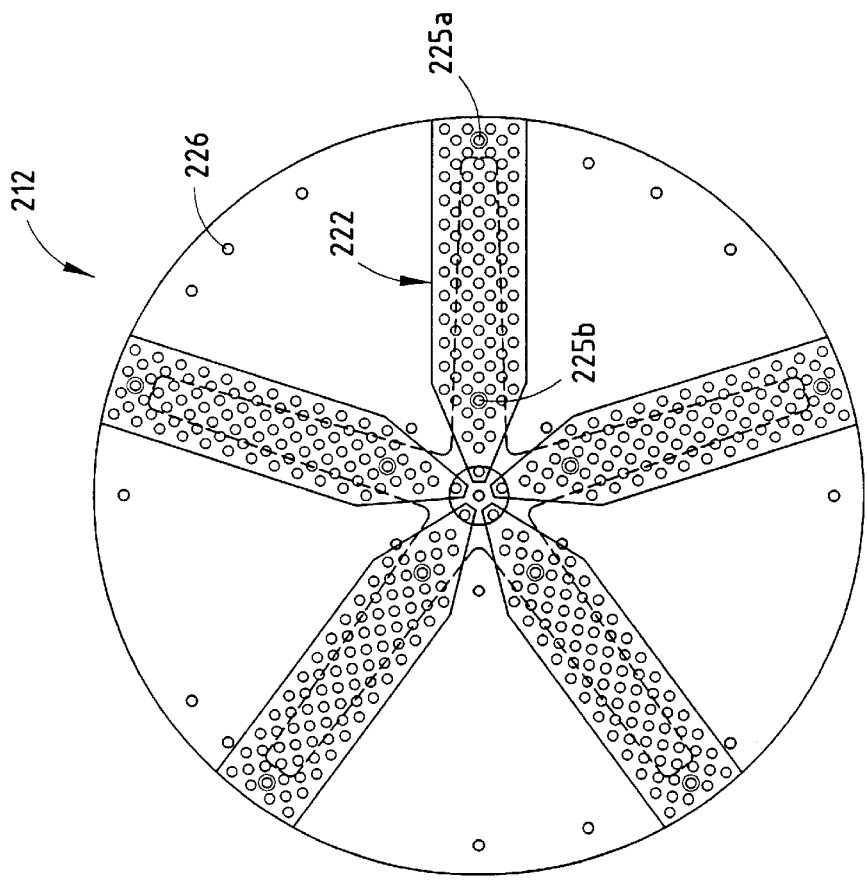
FIG. 13 is a plan view of the platform of FIG. 12.
Figure 12:
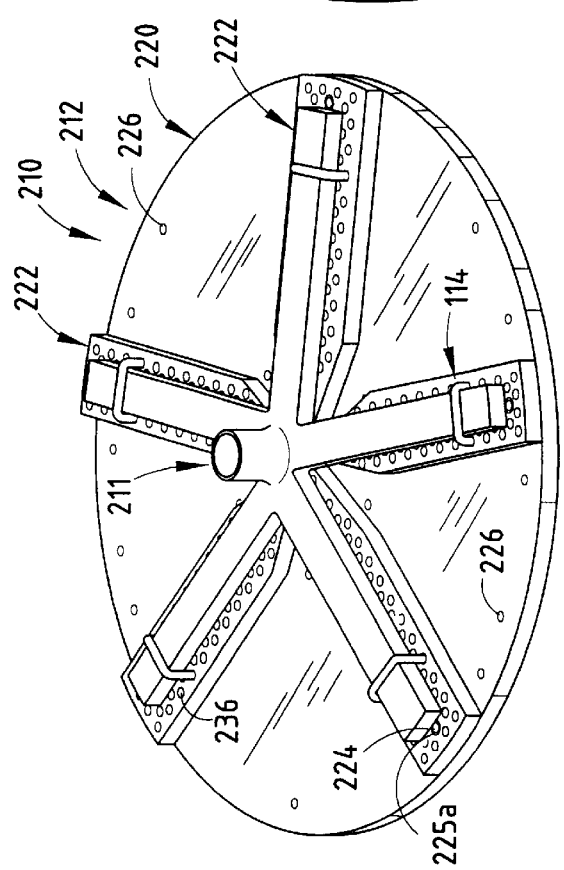
FIG. 12 is a perspective view of another embodiment of the platform of the present invention illustrating the platform holding a radiating object.
Figure 15:
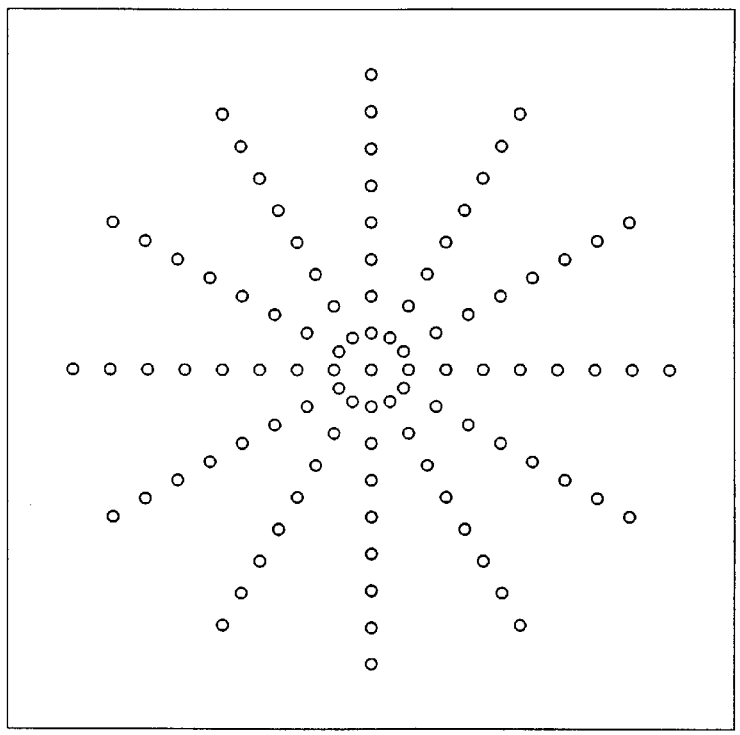
FIG. 15 is a plan view of a prior art platform with a radiating hole pattern.

Referring to FIGS. 12 and 13, a third embodiment 210 of a modular fixturing apparatus of the present invention is illustrated. Modular fixturing apparatus 210 includes a platform 212 and one or more mounting components 114 which are mounted to platform 212 for supporting radial object 211. Radial object 211 in the illustrated embodiment comprises a chair base, but it should be understood that other radial objects can be supported on platform 212. In the illustrated embodiment, mounting components 214 comprise U-shaped clamps; however, it should be understood that the term "mounting components" includes vacuum clamps, magnets, risers, spacers, fasteners, hex rod spherical locators, posts, and other known components for supporting or holding objects on a platform.

Platform 212 includes a sub-plate 220 and a plurality of base plates 222 which are secured to sub-plate 220 by fasteners 224. Fasteners 224 extend through mounting openings 225a and 225b provided in base plates 222 and engage threaded mounting openings 226 provided on sub-plate 220. In the illustrated embodiment, sub-plate 220 comprises a circular plate; however, it can be appreciated that other shaped sub-plates may be used, for example rectangular sub-plates or the like. As noted in reference to the previous embodiment, sub-plate 220 preferably comprises a machined aluminum plate and is preferably anodized in order to preserve its surface characteristics. However, it can be appreciated that other materials, such as steel and structural plastics may be used.

Figure 14:
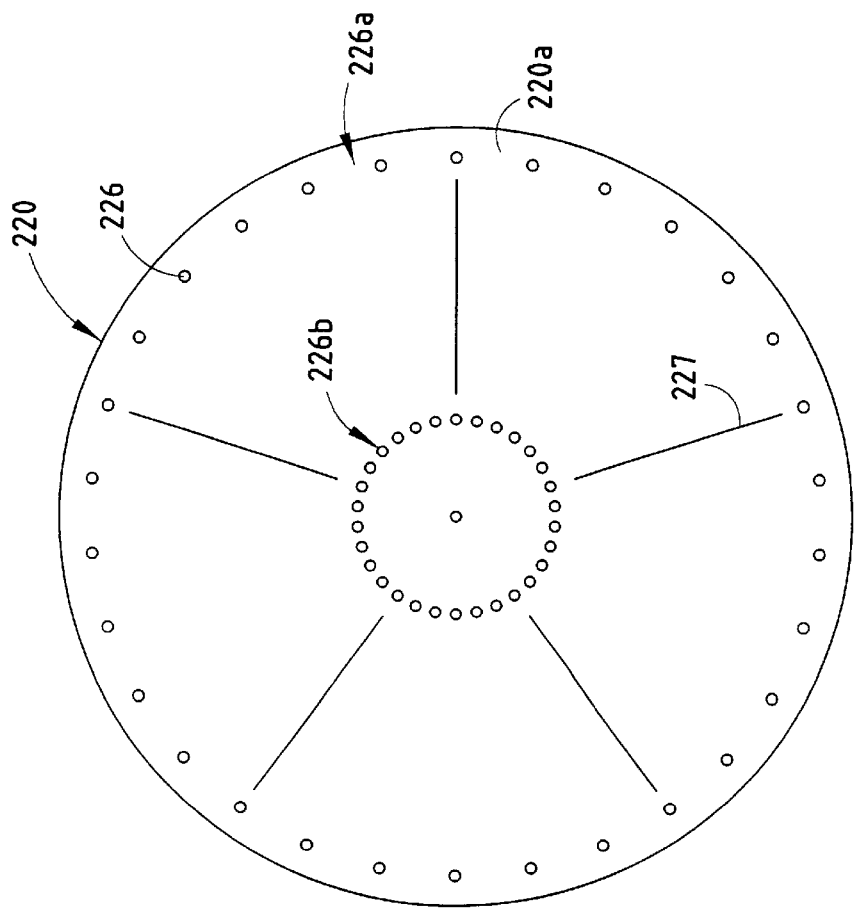
FIG. 14 is a plan view of the sub-plate of the platform of FIG. 12 and 13.

As best seen in FIG. 14, sub-plate 220 includes a plurality of threaded mounting openings 226 which are arranged in a first outer circular pattern 226a around a peripheral portion 220a of sub-plate 220. A second group of mounting openings are arranged in a second circular pattern 226b radially inward of the first group of mounting openings to form with the first group of mounting openings a polar or radial hole pattern. Preferably, each opening in the inner circular pattern 226b is associated with an opening in the outer circular hole pattern and, further, aligned along a radiating axis to define a pair of spaced apart radiating mounting openings for base plates 222, similar to the previous embodiments.

In the illustrated embodiment, mounting openings 226 are arranged to align along radial axes 227 which extend from the center of sub-plate 220 to provide a pair of mounting openings aligned along each radial axis 227 for each respective base plate 222. For example, mounting openings are arranged to align along radial axes 227 extending from the center of sub-plate 220 at 0°, 15°, 30°, 45°, 60°, 72°, 90°, 105°, 120°, 135°, 144°, 165°, 180°, 195°, 216°, 225°, 240°, 255°, 270°, 288°, 300°, 315°, 330°, 345°, and 360°. In this manner, one, two, three, four, five, six, or eight base plates 222 may be mounted to sub-plate 220 in a generally uniform spaced radial pattern.

Base plates 222 are of similar construction to base plates 22 and 122 and, therefore, reference is made to the previous embodiments for further details.

It can be appreciated from the description that the modular fixturing platform of the present invention provides for greater flexibility than heretofore known. In addition to providing a radial pattern of rectangular arrays of mounting openings that allow fixturing of a wide variety of object shapes and permit objects with radiating members to be tooled from both sides, the platform of the present invention can be quickly disassembly and reassembled in one of a plurality of configurations and provides the benefits of both rectangular arrays and radial patterns of mounting holes and more.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which I claim an exclusive property or privilege are defined as follows:

1. A modular fixturing apparatus platform comprising:
a plate assembly comprising a base plate and a sub-plate, said sub-plate having a center and a plurality of radiating axes extending radially outward from said center, said sub-plate having a contiguous mounting surface and including a plurality of sub-plate mounting openings arranged on said mounting surface and configured to receive fasteners, said plurality of sub-plate mounting openings being arranged in a fixed arrangement and being aligned along selected axes of said radiating axes, said base plate being mounted to said sub-plate and aligned along said one of said radiating axes, said base plate having a first plurality of mounting openings and a second plurality of mounting openings, said first plurality of mounting openings comprising through holes for receiving a fastener to secure said base plate to said sub-plate, said second plurality of mounting openings comprising threaded holes and being arranged in a rectangular array, and said rectangular array including at least two rows of said second plurality of mounting openings.

2. The modular fixturing apparatus platform in claim 1, wherein said sub-plate comprises a circular plate or a rectangular plate.

3. The modular fixturing apparatus platform in claim 1, wherein said plate comprises a circular plate.

4. The modular fixturing apparatus platform in claim 1, wherein said mounting openings are arranged in a repeating square pattern within said rectangular array.

5. The modular fixturing apparatus platform in claim 1, wherein said rectangular array includes at least three rows of said second plurality of mounting openings.

6. The modular fixturing apparatus platform in claim 5, wherein said plurality of sub-plate mounting openings are arranged in first and second concentric circular patterns around said center, with each of said openings of said first circular pattern being associated with a respective opening of said second circular pattern and being aligned along a respective radiating axis to form a pair of radiating mounting openings, and said base plate being fastened to one of said pair of respective radiating mounting openings.

7. The modular fixturing apparatus platform in claim 6, wherein said sub-plate includes said pairs of respective radiating mounting openings on radiating axes at intervals of 90°.

8. The modular fixturing apparatus platform in claim 6, wherein said sub-plate includes said pairs of respective radiating mounting openings on radiating axes at intervals of 45° and 90°.

9. The modular fixturing apparatus platform in claim 6, wherein said sub-plate includes said pairs of respective radiating mounting openings on radiating axes at intervals of 30°, 45°, and 90°.

10. The modular fixturing apparatus platform in claim 6, wherein said sub-plate includes said pairs of respective radiating mounting openings on radiating axes at intervals of 30°, 45°, 72°, and 90°.

11. The modular fixturing apparatus platform in claim 6, wherein said sub-plate includes said pairs of respective radiating mounting openings on radiating axes at intervals of 15°.

12. The modular fixturing apparatus platform in claim 5, wherein said base plate includes a rectangular portion and a segment portion, said segment portion being defined between tapered sides extending from said rectangular portion.

13. The modular fixturing apparatus platform in claim 12, wherein said tapered sides form an angle of 45° therebetween.

14. The modular fixturing apparatus platform in claim 1, wherein said rectangular array includes seven rows of said second plurality of mounting openings.

15. A modular fixturing apparatus platform comprising:
a sub-plate having a contiguous mounting surface, a center, and a plurality of radiating axes extending radially outward from said center; and
at least two base plates mounted on said sub-plate, each of said base plates being aligned along one of said radiating axes and having a plurality of threaded mounting openings and a plurality of through holes, said threaded mounting openings being arranged in a rectangular array, each rectangular array including at least two rows of said mounting openings, said through holes for receiving a fastener for securing a respective base plate to said sub-plate.

16. The modular fixturing apparatus platform in claim 15, wherein said sub-plate includes a plurality of second mounting openings aligned along said radiating axes at selected angular intervals, said second mounting openings being configured to receive fasteners, and said base plates being mounted to said sub-plate by fasteners extending into selected openings of said second mounting openings.

17. The modular fixturing apparatus platform in claim 16, wherein said selected angular intervals comprise 90°.

18. The modular fixturing apparatus platform in claim 16, wherein said selected angular intervals comprise 45° and 90°.

19. The modular fixturing apparatus platform in claim 16, wherein said selected angular intervals comprise 30°, 45°, and 90°.

20. The modular fixturing apparatus platform in claim 16, wherein said selected angular intervals comprise 30°, 45°, 72°, and 90°.

21. The modular fixturing apparatus platform in claim 16, wherein said selected angular intervals comprise 15°.

22. The modular fixturing apparatus platform in claim 15, wherein said threaded sub-plate comprises a circular plate or a rectangular plate.

23. The modular fixturing apparatus platform in claim 15, wherein said threaded mounting openings of said base plates are arranged in a repeating square pattern within said rectangular array.

24. The modular fixturing apparatus platform in claim 15, said base plates being arranged on and secured to said sub-plate in a fixed radial pattern, and each of said base plates having a rectangular array of mounting openings.

25. The modular fixturing apparatus platform in claim 24, wherein said base plates include a rectangular portion and a segment portion, each of said segment portions being defined between tapered sides extending from a respective rectangular portion.

26. The modular fixturing apparatus of claim 25, wherein said taper sides of each base plate abut said taper sides of adjacent base plates.

* * * * *